US011547931B2

(12) United States Patent
Munson et al.

(10) Patent No.: US 11,547,931 B2
(45) Date of Patent: Jan. 10, 2023

(54) INPUT APPARATUS AND METHOD

(71) Applicant: Sony Interactive Entertainment Inc., Tokyo (JP)

(72) Inventors: Nicholas Tony Munson, London (GB); Maurizio Cerrato, London (GB); Douglas Ealey, London (GB)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 16/753,649

(22) PCT Filed: Sep. 24, 2018

(86) PCT No.: PCT/GB2018/052707
§ 371 (c)(1),
(2) Date: Apr. 3, 2020

(87) PCT Pub. No.: WO2019/077299
PCT Pub. Date: Apr. 25, 2019

(65) Prior Publication Data
US 2020/0238166 A1    Jul. 30, 2020

(30) Foreign Application Priority Data
Oct. 17, 2017  (GB) ..................... 1717022

(51) Int. Cl.
*A63F 13/22*    (2014.01)
*A63F 13/245*   (2014.01)
*A63F 13/42*    (2014.01)

(52) U.S. Cl.
CPC ............ *A63F 13/22* (2014.09); *A63F 13/245* (2014.09); *A63F 13/42* (2014.09); *A63F 2300/8082* (2013.01)

(58) Field of Classification Search
CPC ........ A63F 13/22; A63F 13/245; A63F 13/42; A63F 2300/8082
See application file for complete search history.

(56) References Cited

U.S. PATENT DOCUMENTS 9,017,167 B2 *  4/2015  Tan ......................... A63F 13/24
                                                         463/37
9,101,838 B2 *  8/2015  Dascher .................. A63F 13/24
(Continued)

FOREIGN PATENT DOCUMENTS

WO    2015118082 A2    8/2015
WO    2016109464 A1    7/2016
WO    2016113540 A1    7/2016

OTHER PUBLICATIONS

International Search Report and Written Opinion for corresponding PCT Application No. PCT/GB2018/052707, 12 pages, dated Nov. 30, 2018.
(Continued)

Primary Examiner — Malina D. Blaise
(74) Attorney, Agent, or Firm — Matthew B. Dernier, Esq.

(57) ABSTRACT

An entertainment system includes a two-handed controller comprising corresponding controls in each of opposing halves of the controller, a first of the corresponding controls in each half providing input in at least two dimensions and a second of the corresponding controls in each half providing input in at least one dimension; and an entertainment device comprising a receiver adapted to receive control input signals from the two-handed controller, and adapted to operate in a first mode where the received control input signals from the controller are interpreted according to an asymmetric control assignment, and to operate in a second mode where control input signals from the first and second controls for a respective half of the controller are used to
(Continued)

control the position of a respective virtual limb in three dimensions within a virtual environment provided by the entertainment device.

15 Claims, 3 Drawing Sheets

(56) References Cited

U.S. PATENT DOCUMENTS

| | | | |
|---|---|---|---|
| 9,539,507 B2 * | 1/2017 | Schoenith | A63F 13/24 |
| 9,804,696 B2 * | 10/2017 | Hall | G06F 3/0383 |
| 9,833,700 B2 * | 12/2017 | Higgins | A63F 13/24 |
| 10,007,339 B2 * | 6/2018 | Long | G06F 3/014 |
| 10,010,789 B2 * | 7/2018 | Koizumi | A63F 13/843 |
| 10,092,829 B2 * | 10/2018 | Ikuta | A63F 13/24 |
| 10,130,875 B2 * | 11/2018 | Long | A63F 13/24 |
| 10,220,308 B2 * | 3/2019 | Ironmonger | H01H 9/0214 |
| 10,279,250 B2 * | 5/2019 | Burgess | A63F 13/20 |
| 10,350,490 B2 * | 7/2019 | Ironmonger | A63F 13/21 |
| 10,688,387 B2 * | 6/2020 | Croft | A63F 13/24 |
| 10,744,406 B2 * | 8/2020 | Ham | G06F 3/039 |
| 10,806,997 B2 * | 10/2020 | Winick | H02J 7/342 |
| 10,843,069 B2 * | 11/2020 | Ironmonger | G06F 3/0202 |
| 10,888,770 B2 * | 1/2021 | Onozawa | A63F 13/428 |
| 10,942,584 B2 * | 3/2021 | Strahle | G06F 3/033 |
| 11,013,986 B2 * | 5/2021 | Ironmonger | A63F 13/24 |
| 11,103,775 B2 * | 8/2021 | Ironmonger | A63F 13/98 |
| 2005/0277470 A1 * | 12/2005 | Watanachote | A63F 13/24 463/37 |
| 2008/0261693 A1 * | 10/2008 | Zalewski | G06F 3/0346 463/31 |
| 2012/0088582 A1 * | 4/2012 | Wu | A63F 13/5255 463/37 |
| 2012/0322555 A1 * | 12/2012 | Burgess | A63F 13/24 463/37 |
| 2013/0222433 A1 * | 8/2013 | Chapman | G06T 13/40 345/660 |
| 2015/0283458 A1 * | 10/2015 | Burgess | A63F 13/24 463/37 |
| 2016/0193529 A1 * | 7/2016 | Burgess | A63F 13/24 463/37 |
| 2016/0195940 A1 * | 7/2016 | Hall | G06F 3/0383 345/158 |
| 2017/0131767 A1 * | 5/2017 | Long | G06F 3/0304 |

OTHER PUBLICATIONS

Combined Search and Examination Report for corresponding PCT Application No. GB 1717022.6, 5 pages, dated Mar. 8, 2018.
Examination Report for corresponding Application No. GB 1717022. 6, 4 pages, dated Jun. 2, 2020.
Communication pursuant to Article 94(3) for corresponding Application No. EP 18779001.9, 5 pages, dated Mar. 11, 2022.

* cited by examiner

INPUT APPARATUS AND METHOD

BACKGROUND

The present invention relates to an input apparatus and method.

Modern videogames are frequently designed to be immersive experiences, particularly with the advent of affordable virtual reality (VR) headsets for use with PCs and consoles. One aspect of in-game immersion that VR highlights (although it is not limited to VR) is that, once the user is able to suspend disbelief and envisage themselves within the game environment, they often wish to interact with the environment in a similarly immersive and hence natural manner.

Consequently, many VR systems offer two separate controllers, one for each hand. In this way, a user can easily point a hand or otherwise move their hands to create gestures and poses that may be relevant to game play, such as notionally holding a bow and pulling back an arrow, eating an virtual object that gives in-game health by bringing it to their mouth, or simply placing an object held in a hand of their in-game avatar on a surface within the videogame environment.

However, not all players of video games have these separate controllers available. This makes it difficult to develop games (or game engines) for VR that have in-game mechanics reliant on the use of separate hand-held controllers, that can also be released on conventional platforms with their (currently) larger markets.

SUMMARY

The present invention seeks to alleviate or mitigate this problem. In a first aspect, an entertainment system is disclosed. In another aspect, an input method is disclosed. Further respective aspects and features of the invention are defined in the appended claims.

BRIEF DESCRIPTION OF THE DRAWING

Embodiments of the present invention will now be described by way of example with reference to the accompanying drawings, in which.

DETAILED DESCRIPTION

An input apparatus and method are disclosed. In the following description, a number of specific details are presented in order to provide a thorough understanding of the embodiments of the present invention. It will be apparent, however, to a person skilled in the art that these specific details need not be employed to practice the present invention. Conversely, specific details known to the person skilled in the art are omitted for the purposes of clarity where appropriate.

Figure 1:
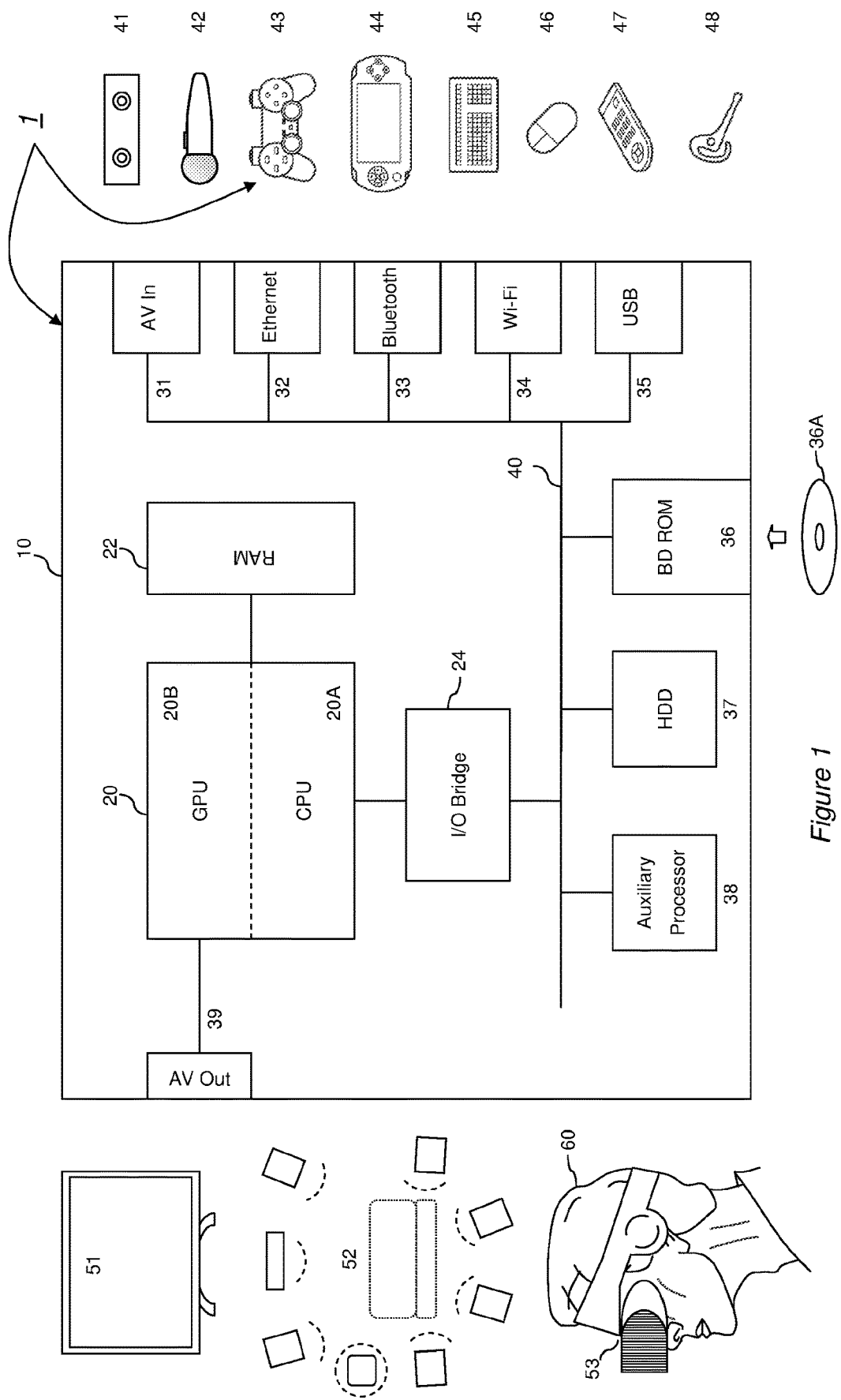
FIG. 1 is a schematic diagram of an entertainment system in accordance with embodiments of the present invention.

An example entertainment system 1 in accordance with an embodiment of the present invention is shown in FIG. 1, and comprises an entertainment device 10 such as the Sony® PlayStation 4, and at least a first conventional two-handed controller such as the Sony® DualShock 4® controller 43.

This entertainment system 1 may exist within a broader ecosystem comprising one or more other peripherals operably coupled with or complementing the entertainment device, as detailed below.

FIG. 1 schematically illustrates the overall system architecture of a Sony® PlayStation 4® entertainment device. A system unit 10 is provided, with various peripheral devices connectable to the system unit.

The system unit 10 comprises an accelerated processing unit (APU) 20 being a single chip that in turn comprises a central processing unit (CPU) 20A and a graphics processing unit (GPU) 20B. The APU 20 has access to a random access memory (RAM) unit 22.

The APU 20 communicates with a bus 40, optionally via an I/O bridge 24, which may be a discreet component or part of the APU 20.

Connected to the bus 40 are data storage components such as a hard disk drive 37, and a Blu-ray® drive 36 operable to access data on compatible optical discs 36A. Additionally the RAM unit 22 may communicate with the bus 40.

Optionally also connected to the bus 40 is an auxiliary processor 38. The auxiliary processor 38 may be provided to run or support the operating system.

The system unit 10 communicates with peripheral devices as appropriate via an audio/visual input port 31, an Ethernet® port 32, a Bluetooth® wireless link 33, a Wi-Fi® wireless link 34, or one or more universal serial bus (USB) ports 35. Audio and video may be output via an AV output 39, such as an HDMI port.

The peripheral devices may include a monoscopic or stereoscopic video camera 41 such as the PlayStation Eye®; wand-style videogame controllers 42 such as the PlayStation Move® and conventional two-handed handheld videogame controllers 43 such as the DualShock 4®; portable entertainment devices 44 such as the PlayStation Portable® and PlayStation Vita®; a keyboard 45 and/or a mouse 46; a media controller 47, for example in the form of a remote control; and a headset 48. Other peripheral devices may similarly be considered such as a printer, or a 3D printer (not shown).

As noted above, the system unit 10 and at least one conventional two-handed handheld videogame controller 43 together comprise an entertainment system 1 in accordance with an embodiment of the present invention.

The GPU 20B, optionally in conjunction with the CPU 20A, generates video images and audio for output via the AV output 39. Optionally the audio may be generated in conjunction with or instead by an audio processor (not shown).

The video and optionally the audio may be presented to a television 51. Where supported by the television, the video may be stereoscopic. The audio may be presented to a home cinema system 52 in one of a number of formats such as stereo, 5.1 surround sound or 7.1 surround sound. Video and audio may likewise be presented to a head mounted display unit 53 worn by a user 60.

Regarding peripherals, as noted above the system unit is provided with at least one hand-held controller 43 such as the DualShock 4®. This controller may be used to interact with user interfaces presented by the system unit that are associated with the operating system and/or a particular game or application being run by the system unit. Illuminated regions 431 may be provided on such controllers. The controller may comprise motion sensors 432 to detect transverse movement along three axes and rotational movement around three axes, and wireless communication means (such as Bluetooth®) to convey movement data to the system unit. Optionally such controls can also receive control data from the system unit to enact functions such as a rumble effect, or to change the colour or brightness of the illuminated region, where these are supported by the controller.

The user may also interact with the system unit using a video camera 41 such as the PlayStation Eye®. This may provide monoscopic or stereoscopic video images to the system unit 10 via for example AV input 31. Where these images capture some or all of the user, the user may enact gestures, facial expressions or speech as appropriate to interact with the currently presented user interface.

The system unit may also communicate with a portable entertainment device 44. The portable entertainment device 44 will comprise its own set of control inputs and audio/visual outputs. Consequently, in a 'remote play' mode some or all of the portable entertainment device's inputs may be relayed as inputs to the system unit 10, whilst video and/or audio outputs from the system unit 10 may be relayed to the portable entertainment device for use with its own audio/visual outputs. Communication may be wireless (e.g. via Bluetooth® or Wi-Fi®) or via a USB cable. During such remote play, the control inputs of the portable entertainment device 44 are used in place of those of the conventional two-handed controller 43, and hence in this remote play mode the portable entertainment device 44 may be considered functionally equivalent to a conventional two-handed controller 43 for the purposes of embodiments of the present invention.

Other peripherals that may interact with the system unit 10, via either wired or wireless means, include a keyboard 45, a mouse 46, a media controller 47, and a headset 48. The headset may comprise one or two speakers, and optionally a microphone.

Optionally, video may be conveyed to a head mounted display 53 such as the Sony PSVR® display. The head mounted display typically comprises two small display units respectively mounted in front of the user's eyes, optionally in conjunction with suitable optics to enable the user to focus on the display units. Alternatively one or more display sources may be mounted to the side of the user's head and operably coupled to a light guide to respectively present the or each displayed image to the user's eyes. Alternatively, one or more display sources may be mounted above the user's eyes and presented to the user via mirrors or half mirrors. In this latter case the display source may be a mobile phone or portable entertainment device 44, optionally displaying a split screen output with left and right portions of the screen displaying respective imagery for the left and right eyes of the user. Their head mounted display may comprise integrated headphones, or provide connectivity to headphones. Similarly the mounted display may comprise an integrated microphone or provide connectivity to a microphone.

In operation, the entertainment device defaults to an operating system such as a variant of FreeBSD 9.0. The operating system may run on the CPU 20A, the auxiliary processor 38, or a mixture of the two. The operating system provides the user with a graphical user interface such as the PlayStation Dynamic Menu. The menu allows the user to access operating system features and to select games and optionally other content.

The OS typically provides a series of icons for the user to select amongst, for example in the form of two parallel horizontal rows. In this example the content of the top row may be fixed and relate to operating system features, whilst the bottom row may be at least in part dynamically assembled to relate to recent activities, such as providing launch icons for the most recently played or downloaded games.

The bottom row of the menu may show icons for recently played games, enabling quick access. Optionally selection of a game icon provides a summary of game progress and any relevant statistics, and where appropriate information such as progress and commentary from friends who have also played or are playing the game. Other information regarding the game may also be provided such as details of recently applied updates, or links to downloadable content associated with the game that is available in the online store.

The bottom row may also provide access to other media sources such as a web browser, television and music media applications, and any live streaming service provided by the entertainment device network. Additionally an icon may be provided to access the full library of content on the device, such as games that have not been recently played.

The user interface of the operating system may also receive inputs from specific controls provided on peripherals, such as the conventional two-handed controller 43. In particular, a button to switch between a currently played game and the operating system interface may be provided. Additionally a button may be provided to enable sharing of the player's activities with others; this may include taking a screenshot or recording video of the current display, optionally together with audio from a user's headset. Such recordings may be uploaded to social media hubs such as the entertainment device network, Twitch®, Facebook® and Twitter®.

Figure 2A:
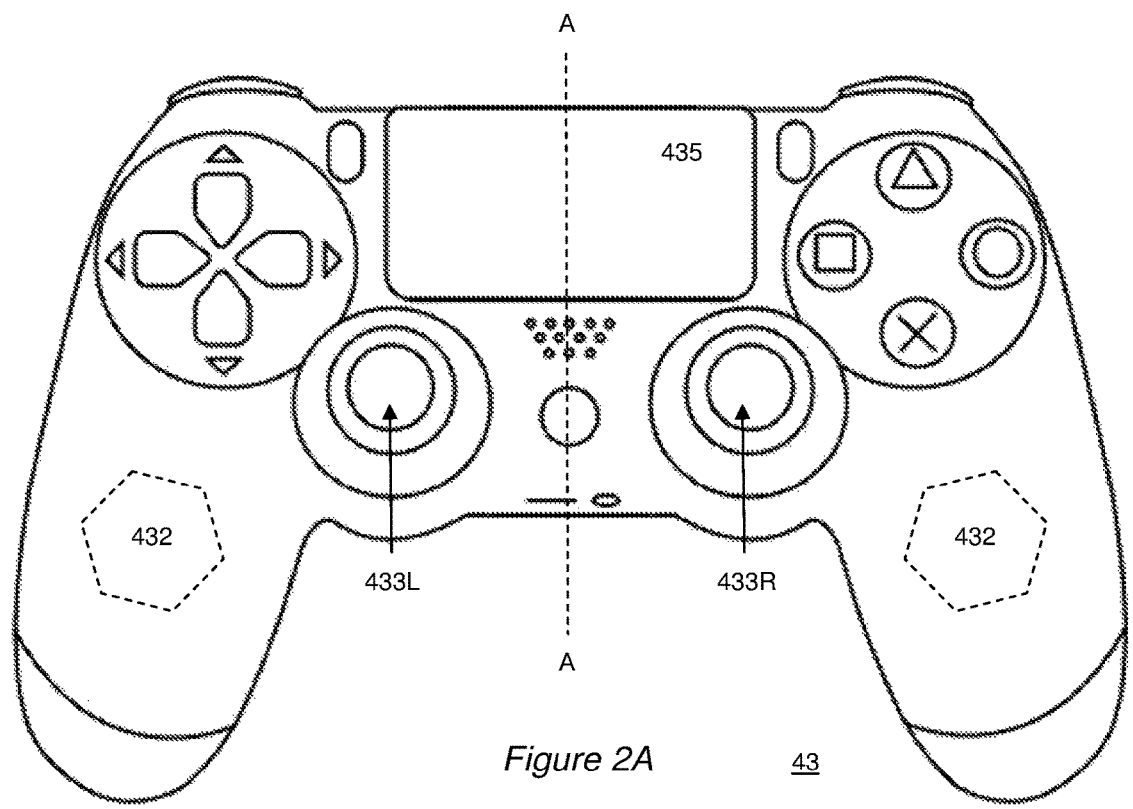
FIGS. 2A and 2B a plan and side view schematic diagrams of a two-handed controller in accordance with embodiments of the present invention.
Figure 2B:
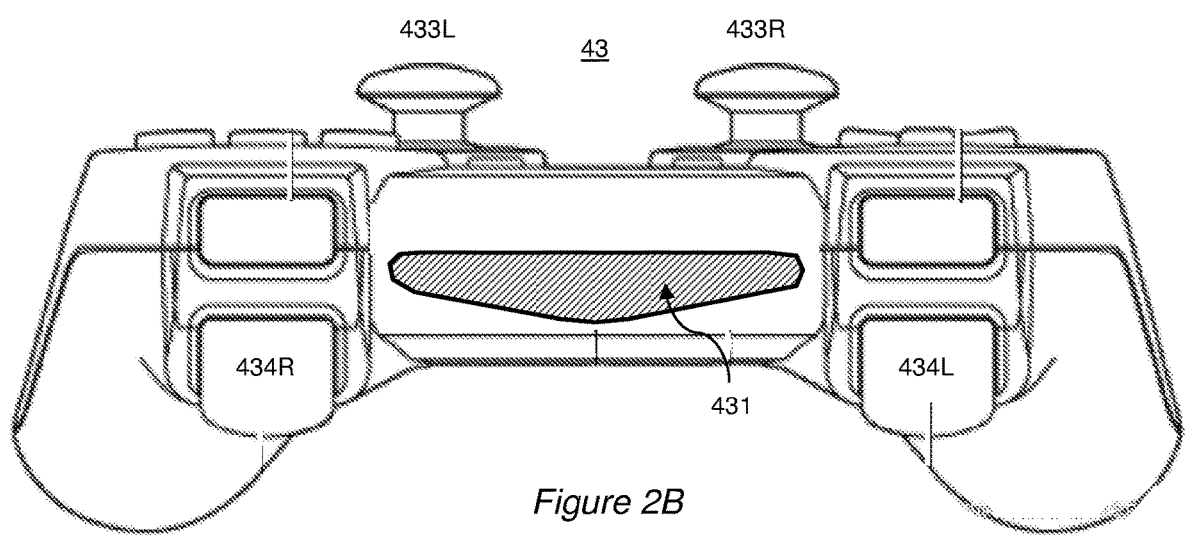

Referring now additionally to FIGS. 2A and 2B, in an embodiment of the present invention an entertainment system 1 comprises a two-handed controller 43. Examples of such two-handed controllers include the Sony® DualShock 4®, and the Xbox One® controller. More generally, a two-handed controller will typically have has two handles and/or be ergonomically designed to accommodate being held using two hands. Hence other examples include the PlayStation Vita® (for example when being used in remote play mode) and the Nintendo Switch® in either controller-only or portable configurations. By contrast, one-handed controllers include the PlayStation Move® and the HTC Vive Controller®, and more generally tend to be columnar and have their control inputs clustered along a single primary axis.

Meanwhile, two handed controllers tend to comprise corresponding controls in each of opposing halves of the controller. That is to say, they tend to be roughly symmetrical about a central line A-A between the handles of the controller. The symmetry is typically physical, but may only be functional (e.g. if the joystick and key pad on one side are swapped, there is still functional symmetry).

Each side/half typically comprises a first input unit such as a joystick (433L,R), a joypad or set of directional buttons providing input in at least two dimensions (up/down, left/right) and in the case of a joystick may optionally be depressible, typically to actuate a button.

Each side/half typically also comprises a second input unit such as a trigger (434L,R) or similar pressure-sensitive button providing input in at least one dimension (e.g. as a function of the extent of trigger or button depression).

Preferably, the first input unit and the second input unit can be operated simultaneously with the same hand (e.g. they are not both ergonomically positioned to be used by the same digit of the user's hand). Clearly a thumb controlled joystick and index-finger controlled trigger would meet this criterion. It will be appreciated that this criterion is preferable but not essential (it would simply mean that navigating in three dimensions would be a slower, two-step process using the same digit for x,y and separately z axis control).

It will be appreciated therefore that each of the left and right halves of the controller comprises inputs that are together capable of navigating within 3 dimensions, by virtue of the first input unit—whose inputs can be interpreted to navigate the x,y plane, and the second input unit—whose inputs can be interpreted to navigate the z-axis.

Within the entertainment system 1, this interpretation is performed by an entertainment device (10) and comprising a receiver adapted to receive control input signals from the two-handed controller (for example a wired or wireless port, such as USB port 35, or Bluetooth® port 33).

The entertainment device, operating under suitable software instruction, is adapted to operate in a first mode where the received control input signals from the controller are interpreted according to an asymmetric control assignment.

It will be understood that 'asymmetric control assignment' means that at least one of the first input unit on each side and the second input unit on each side are interpreted as having a different or heterogenous function to its counterpart. Hence for example the joystick 433R on the right side of the controller may be used to change the player's x,y position within the world (e.g. walk forwards/backwards and strafe left or right) whilst the left joystick 433L is used to control a so-called 'mouselook' direction of view, allowing the user to look around from their current position. Alternatively or in addition, the trigger 434R on the right side of the controller may be used for acceleration, whilst the trigger 434L on the left side is used for a brake. Other configurations will be apparent to the skilled person.

It will also be appreciated that the first mode may optionally occur within part of a game where independent control of two of the avatar's limbs is not essential (for example when driving a car, or holding a two-handed weapon such as a rifle or machine gun). Alternatively or in addition, the first mode may be the default mode for the operating system of the entertainment device, and the asymmetric control assignment is the input map used for navigating within the OS.

The entertainment device, operating under suitable software instruction, is also adapted to operate in a second mode where control input signals from the first and second controls for a respective half of the controller are used to control the position of a respective virtual limb in three dimensions within a virtual environment provided by the entertainment device.

Hence for all or part of a game where independent control of two of the avatar's limbs is desired, the first and second input units on the left side of the controller (433L, 434L) may be used to control the position of a first limb in three dimensions (x,y, and z respectively), whilst the first and second input units on the right side of the controller (433R, 434R) may be used to control the position of a second limb in three dimensions (x,y, and z respectively).

The avatar's limbs will typically be arms and the right arm will correspond with the controls on the right side whilst the left arm will correspond with the controls on the left side (enabling a natural replication of movement of the user's arms) but the limbs are not limited to this, depending on the avatar and/or in game situation; hence for example the limbs may be tentacles, or may be legs.

Typically, the second mode of input is used to control an end point of each respective limb (e.g. a notional hand position or tentacle tip). The entertainment device may then display the limb with appropriate articulation to position the end point at the currently controlled position.

The extent of movement of a respectively controlled limb may be at a game designer's discretion. Hence for example one may take a notional circle of maximum reach for a limb in the x,y plane, and map the maximum travel of the joystick to this reach. The user is then able to navigate within this circle by proportionate use of the joystick. Alternatively or in addition, if the user pushes the joystick to its maximum travel in a given direction, the avatar may be arranged to rotate or move in that direction, thus extending the reach of the limb in the chosen direction without the need to drop out of the second mode into a different navigation or input mode.

Meanwhile, a trigger button typically defaults to a distal position from the user, by virtue of a spring or other resilience mechanism, so that the trigger is actuated by the index finger pulling towards the user. Hence in an embodiment of the present invention, the limb is at its maximum z-axis extent when the trigger has not been activated/is at rest, and squeezing the trigger draws the limb back in to its minimum extent proportional to the degree of activation (squeezing).

It will be appreciated that the actual depth or extent of the limb in the z-axis may also change as a function of the x, y axis; a limb that is notionally anchored to the avatar's body has a fixed length and hence represents a vector comprising x, y and z components. Consequently the extent of the z-axis position may be reduced when the limb is also extended in the x and/or y direction.

It will be appreciated from the description above, and elsewhere herein, that 'asymmetric control assignment' means that corresponding controls in each corresponding half of the controller have different functions. Notably, this is not the same as saying that corresponding controls in each half have the same function, but applied to different objects.

Hence when using an input mode with asymmetric control assignment, even if a game lets a user control a first virtual limb using one half of the controller, the user could not control another virtual limb in the same way using the other half of the controller, because the control assignment is asymmetric (i.e. the type of control assigned to the left-hand joystick is not the same as the type of control assigned to the right hand joystick, so equivalent control of two limbs using the same actions on the left and right halves of the joystick would not be possible).

An example of a typical asymmetric control assignment would have gross movement of a character controlled by the joystick 433L, and the viewpoint controlled by joystick 433R, for example. Meanwhile trigger buttons 434R, L may respectively control attack and defence actions, or acceleration/braking etc.

Meanwhile in the claimed second mode, one half of the controller is used to control a first limb, whilst the other half of the controller is used to control a second limb (as described previously herein). As such, both halves now operate in the same manner to each control a respective limb.

In this way, the system interprets inputs from the controller as a conventional controller with asymmetric control assignment in the first mode, whilst in the second mode interpreting inputs from at least first and second controls in respective halves the controller as symmetric inputs, in a manner similar to receiving inputs from two parallel single handed controllers such as the PlayStation Move.

Variant Embodiments

In a first variant embodiment, it will be appreciated that whilst the joysticks (433L,R) provide two-dimensional input, they are not the only inputs available on some controllers that may fulfil this function. For example, the Dual Shock 4® provides a touch sensitive surface 435 that spans the A-A centre line.

In the first mode, this touch sensitive surface operates as a single surface and hence its inputs are asymmetric, in that a touch 25% of the way across the touch surface is interpreted differently to a touch 75% of the way across the top surface. However in the second mode the touch sensitive surface operates as two separate half-sized surfaces bounded by the A-A centre line; that is to say inputs to each half of the surface are treated as having a maximum left and right extent bounded by the left or right physical edge of the surface and the A-A centre line. Consequently the half sized surfaces so created are functionally symmetric, with a touch 25% of the way across the full touch surface being interpreted the same as a touch 75% of the way across the full touch surface, because these positions are now interpreted as being in the centres of respective half-sized touch surfaces.

Hence the user can move their left thumb or finger over the left half of the touch surface, and the right thumb or finger over the right half of the touch surface to provide an x, y input in a manner analogous to the use of their thumbs to move the left and right joysticks.

An advantage of this variant embodiment is that the joysticks can still be used in the first mode/conventional manner, so that the user can rapidly swap between normal game functions and independent control of their avatar's limbs by swapping from the joysticks to the touch surface.

Optionally, the triggers (434L,R) may also operate in the first mode/a conventional manner until separate touches are detected on each half of the touch sensor, indicating a desire to operate in the second mode; at this point inputs from the triggers are instead interpreted as z axis control inputs in the second mode instead of for example firing a gun or applying car brakes in the first mode. Breaking contact with the touch sensor, or resuming control with the joysticks, may then be used to indicate a desire to revert to the first mode, after which the triggers are again interpreted by the entertainment device according to their previous function in the first mode.

In this way, conventional play using an asymmetric control assignment in the first mode can easily accommodate independent limb control of the avatar in the second mode at the user's instigation, but without the need for pressing a dedicated button or selecting a menu option; instead there is a simple and intuitive movement from the joysticks (e.g. used for navigation to an item) to the touch surface (e.g. used for interaction with this item) and back again, with the apparent functions of the triggers changing according to mode.

In another variant embodiment, it will be appreciated that the controller comprises one or more motion detectors 432 (e.g. accelerometers and/or gyroscopes) that are capable of detecting motion in the x, y and z directions. Hence the sensors in the x, y directions come operable as the first control equivalent to the joystick 433L, R or respective halves of the touch sensor 45, and the sense in this direction becomes operable as the second control equivalent to the trigger in other embodiments.

However, there is the problem that these are housed within the rigid body of the controller and hence it is not straightforward to isolate independent left and right limb control.

Accordingly, in a variant embodiment, in the second mode the left and right triggers are used to indicate which of the two limbs are controlled by the detected motion of the controller, allowing alternate control of movement of the limbs. Alternatively in the second mode the yaw of the controller (its rotation about a perpendicular axis) may be used to indicate which of the left and right limbs are to be controlled by movement in the x, y and z directions. Hence twisting the controller so that the left shoulder (the area near the left trigger button) is in front of the right shoulder (the area near the right trigger button) will indicate control of the left limb, and vice versa.

In another variant embodiment, the joysticks, joypads or equivalently the respective halves of the touch surface are used to provide the x, y input as per previous embodiments herein, but the z-axis input is provided by motion detection. This addresses the potential problem that when using the triggers, the avatar's limbs will default fault to the maximum extent when the triggers are at rest; use of motion detection allows z-axis movement from the current position of the controller to be captured, and thus allows a more natural initial default position for the avatar's limbs. Again, the motion detection can be assigned to one or other of the limbs by using the left or right triggers or yaw.

The issue of assigning movements based on inputs from the motion detector(s) in the rigid controller to a particular limb may be addressed using various strategies. Firstly they may be assigned explicitly, for example using a respective trigger button, other buttons, or yaw as described previously herein; secondly they may be assigned to both limbs to an equal extent (where motion detection is only used for the z-axis, independent x, y inputs can still be provided using the techniques described herein)—this can be useful to ensure both hands reach an object at the same time, and/or thirdly such movements can be assigned to the currently moving limb, although the most recently explicitly controlled, or the limb closest to a predetermined target object, or the limb holding a predetermined target object, until an alternative limb is specified.

In another variant embodiment, it will be appreciated that the overall entertainment system 1 can comprise a video camera 41 operably coupled to the entertainment device 10. Meanwhile the controller 43 may comprise a light source 431.

Consequently motion of the light source within an image captured by the video camera may provide and x,y input for one or both limbs, with the assignment of motion to one or both limbs following one or more of the strategies described previously herein. In principle, alternatively or in addition the light source can be used to determine motion in the z-axis depending upon relative size of the image. Again the assignment of this motion to one or both limbs can follow one or more the strategies described previously herein.

Summary

In a summary embodiment of the present invention, an entertainment system (1) comprises a two-handed controller (43) such as a Dual Shock 4® controller in turn comprises corresponding controls in each of opposing halves of the controller (e.g. left and right halves as apparent during normal use). A first of the corresponding controls (433L,R) in each half provides input in at least two dimensions; examples include a joystick, joypad or equivalent, or a respective half of a touch sensitive surface (435), or a motion detector (432) whose input is temporarily assigned as a left or right input. A second of the corresponding controls (434L,R) in each half provides input in at least one dimension; examples include a pressure sensitive trigger, or a motion detector whose input is temporarily assigned as a left or right input.

The entertainment system also comprises an entertainment device (10), in turn comprising a receiver (33, 34, 35) (for example a Bluetooth®, USB or other wireless input port) adapted to receive control input signals from the two-handed controller, and the entertainment device is adapted (for example by software instruction) to operate in a first mode where the received control input signals from the controller are interpreted according to an asymmetric control assignment.

This first mode may be used during navigation of the operating system of the entertainment device and/or during interactions part of a videogame. It will be appreciated that different asymmetric control assignments may be used for the operating system and the videogame.

The entertainment device is similarly adapted to also operate in a second mode where control input signals from the first and second controls for a respective half of the controller are used to control the position of a respective virtual limb in three dimensions within a virtual environment provided by the entertainment device. The virtual environment is typically but not necessarily part of a videogame; for example a virtual environment may be part of a 3D sculpting application.

As is noted previously herein, for inputs that respond to gross movement of the controller such as motion detectors or the results of image analysis of a scene comprising the controller, these inputs may be treated as corresponding to a respective half of the controller based on one or more assignment strategies.

In an instance of this summary embodiment, the first of the corresponding controls in each half is one selected from the list consisting of a joystick (or equivalently a joypad) (433L,R) in a respective half of the controller; and a respective part of a touch sensitive panel (435) that occupies part of each opposing half of the controller.

In an instance of this summary embodiment, the second of the corresponding controls in each half is a pressure sensitive trigger button (434L,R) in a respective half of the controller.

In an instance of this summary embodiment, the second of the corresponding controls in each half is motion detector (432). As described previously herein, the motion detector may be assigned to respective halves or both halves by a number of strategies.

In this case, motion of the controller detected by the motion detector may be translated to motion in a depth axis for both limbs to an equal extent. Alternatively, motion of the controller detected by the motion detector may be translated to motion in a depth axis for the limb whose position is currently or was most recently controlled.

In an instance of the summary embodiment, the second of the corresponding controls in each half is a light on the controller, operable to be detected in analysis by the entertainment device of a video image capturing an image of the controller to detect motion of the light. As described previously herein, an input determined from the position position of the light within the image may be assigned to respective halves or both halves by a number of strategies.

In this case, motion of the light detected by the entertainment device may be translated to motion in a depth axis for both limbs to an equal extent. Alternatively, motion of the light detected by the entertainment device may be translated to motion in a depth axis for the limb whose position is currently or was most recently controlled.

Figure 3:
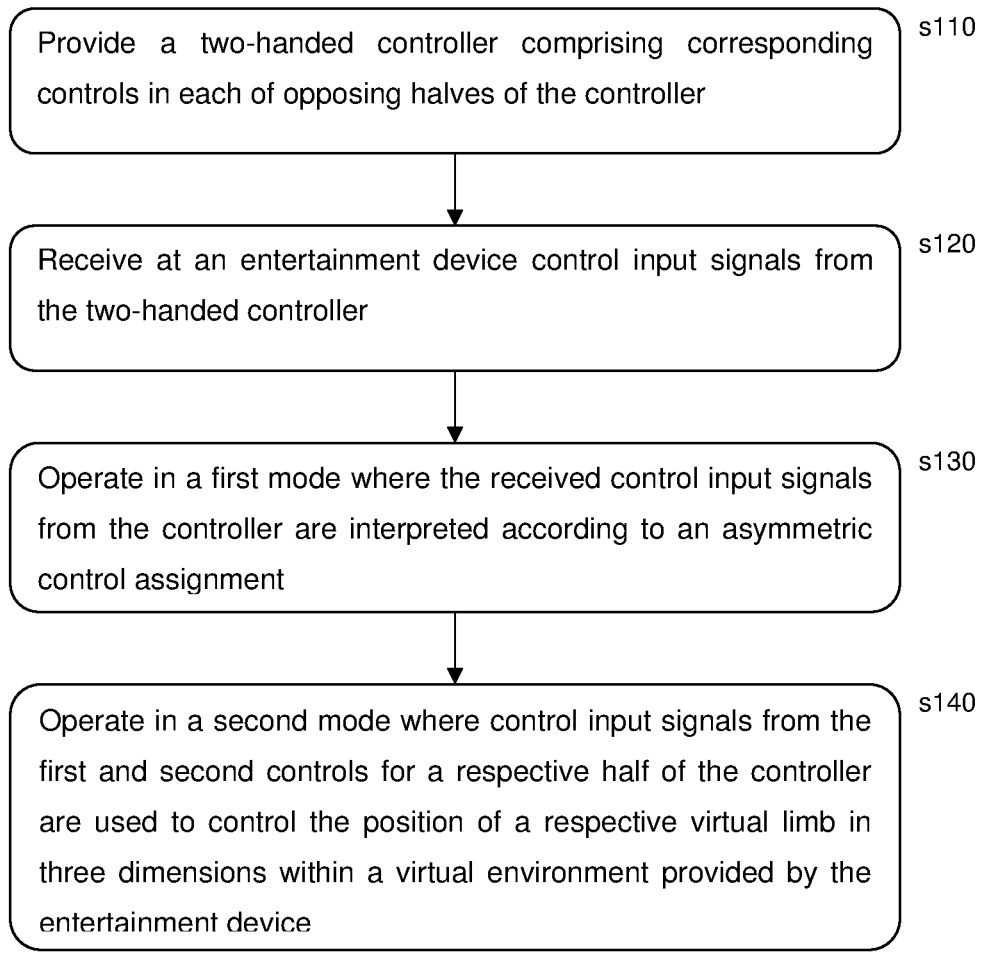
FIG. 3 is a flow diagram of an input method in accordance with embodiments of the present invention.

Turning now to FIG. 3, in a summary embodiment of the present invention, an input method comprises:

in a first step s110, providing a two-handed controller comprising corresponding controls in each of opposing halves of the controller, where a first of the corresponding controls in each half providing input in at least two dimensions and a second of the corresponding controls in each half providing input in at least one dimension;

in a second step s120, receiving at an entertainment device control input signals from the two-handed controller;

in a third step s130, operating in a first mode where the received control input signals from the controller are interpreted according to an asymmetric control assignment; and in a fourth step s140, operating in a second mode where control input signals from the first and second controls for a respective half of the controller are used to control the position of a respective virtual limb in three dimensions within a virtual environment provided by the entertainment device.

It will be apparent to a person skilled in the art that variations in the above method corresponding to operation of the various embodiments of the apparatus as described and claimed herein are considered within the scope of the present invention, including but not limited to:

the first of the corresponding controls in each half been one selected from the list consisting of a joystick in a respective half of the controller, and a respective part of a touch sensitive panel that occupies part of each opposing half of the controller;

the second of the corresponding controls in each half been a pressure sensitive trigger button in a respective half of the controller;

the second of the corresponding controls in each half being an accelerometer; and the second of the corresponding controls in each half is a light on the controller, operable to be detected in analysis by the entertainment device of a video image capturing an image of the controller to detect motion of the light.

It will be appreciated that the above methods may be carried out on conventional hardware suitably adapted as applicable by software instruction or by the inclusion or substitution of dedicated hardware.

Thus the required adaptation to existing parts of a conventional equivalent device may be implemented in the form of a computer program product comprising processor implementable instructions stored on a non-transitory machine-readable medium such as a floppy disk, optical disk, hard disk, PROM, RAM, flash memory or any combination of these or other storage media, or realised in hardware as an ASIC (application specific integrated circuit) or an FPGA (field programmable gate array) or other configurable circuit suitable to use in adapting the conventional equivalent device. Separately, such a computer program may be transmitted via data signals on a network such as an Ethernet, a wireless network, the Internet, or any combination of these or other networks.

The invention claimed is:

1. An entertainment system (1) comprising
a two-handed controller (43) comprising corresponding controls in each of opposing halves of the controller, a first of the corresponding controls (433L,R) in each half providing input in at least two dimensions and a second of the corresponding controls (434L,R) in each half providing input in at least one dimension; and
an entertainment device (10) comprising a receiver (33, 34, 35) adapted to receive control input signals from the two-handed controller, and, in response to the same received control input signals the entertainment device is adapted to operate in either of a first mode and a second mode, wherein:

in the first mode, the same received control input signals from the controller are interpreted according to an asymmetric control assignment in which the first control in one of the opposing halves of the controller and the first control in the other one of the opposing halves of the controller provide different functions, and the second control in the one of the opposing halves of the controller and the second control in the other one of the opposing halves of the controller provide different functions, and in the second mode, the same received control input signals from the controller are interpreted according to a control assignment where control input signals from the first and second controls for the one of the opposing halves of the controller are used to control a position of a first respective virtual limb in three dimensions within a virtual environment provided by the entertainment device, and the received control input signals from the first and second controls for the other one of the opposing halves of the controller are used to control the position of a second respective virtual limb in three dimensions.

2. An entertainment system according to claim 1 in which the first of the corresponding controls in each half is one selected from the list consisting of
    i. a joystick in the respective half of the controller; and
    ii. a respective part of a touch sensitive panel that occupies part of each opposing half of the controller.

3. An entertainment system according to claim 1 in which the second of the corresponding controls in each half is a pressure sensitive trigger button in a respective half of the controller.

4. An entertainment system according to claim 1, in which the second of the corresponding controls in each half is motion detector.

5. An entertainment system according to claim 4 in which motion of the controller detected by the motion detector is translated to motion in a depth axis for both limbs to an equal extent.

6. An entertainment system according to claim 4 in which motion of the controller detected by the motion detector is translated to motion in a depth axis for the limb whose position is currently or was most recently controlled.

7. An entertainment system according to claim 1, in which the second of the corresponding controls in each half is a light on the controller, operable to be detected in analysis by the entertainment device of a video image capturing an image of the controller to detect motion of the light.

8. An entertainment system according to claim 7 in which motion of the light detected by the entertainment device is translated to motion in a depth axis for both limbs to an equal extent.

9. An entertainment system according to claim 7 in which motion of the light detected by the entertainment device is translated to motion in a depth axis for the limb whose position is currently or was most recently controlled.

10. An input method performed by an entertainment system, comprising
    providing a two-handed controller of the entertainment system, the two-handed controller comprising corresponding controls in each of opposing halves of the controller, a first of the corresponding controls in each half providing input in at least two dimensions and a second of the corresponding controls in each half providing input in at least one dimension; and
    receiving, at an entertainment device of the entertainment system, control input signals from the two-handed controller and, in response to the same received control input signals, the entertainment device is adapted to operate in either of a first mode and a second mode, wherein:
    in the first mode, the same received control input signals from the controller are interpreted according to an asymmetric control assignment in which the first control in one of the opposing halves of the controller and the first control in the other one of the opposing halves of the controller provide different functions, and the second control in the one of the opposing halves of the controller and the second control in the other one of the opposing halves of the controller provide different functions, and
    in the second mode, the same received control input signals from the controller are interpreted according to a control assignment where control input signals from the first and second controls for the one of the opposing halves of the controller are used to control a position of a first respective virtual limb in three dimensions within a virtual environment provided by the entertainment device, and the received control input signals from the first and second controls for the other one of the opposing halves of the controller are used to control the position of a second respective virtual limb in three dimensions.

11. An input method according to claim 10, in which the first of the corresponding controls in each half is one selected from the list consisting of
    i. a joystick in the respective half of the controller; and
    ii. a respective part of a touch sensitive panel that occupies part of each opposing half of the controller.

12. An input method according to claim 10, in which the second of the corresponding controls in each half is a pressure sensitive trigger button in a respective half of the controller.

13. An input method according to claim 10, in which the second of the corresponding controls in each half is an accelerometer.

14. An input method according to claim 10, in which the second of the corresponding controls in each half is a light on the controller, operable to be detected in analysis by the entertainment device of a video image capturing an image of the controller to detect motion of the light.

15. A non-transitory, computer readable storage medium containing a computer program, which when executed by a computer, causes the computer to execute an input method, by carrying out actions, comprising:
    providing a two-handed controller comprising corresponding controls in each of opposing halves of the controller, a first of the corresponding controls in each half providing input in at least two dimensions and a second of the corresponding controls in each half providing input in at least one dimension; and
    receiving, at an entertainment device of the entertainment system, control input signals from the two-handed controller and, in response to the same received control input signals, the entertainment device is adapted to operate in either of a first mode and a second mode, wherein:
    in the first mode, the same received control input signals from the controller are interpreted according to an asymmetric control assignment in which the first control in one of the opposing halves of the controller and the first control in the other one of the opposing halves of the controller provide different functions, and the second control in the one of the opposing halves of the controller and the second control in the other one of the opposing halves of the controller provide different functions, and in the second mode, the same received control input signals from the controller are interpreted according to a control assignment where control input signals from the first and second controls for the one of the opposing halves of the controller are used to control a position of a first respective virtual limb in three dimensions within a virtual environment provided by the entertainment device, and the received control input signals from the first and second controls for the other one of the opposing halves of the controller are used to control the position of a second respective virtual limb in three dimensions.

\* \* \* \* \*